UNITED STATES PATENT OFFICE.

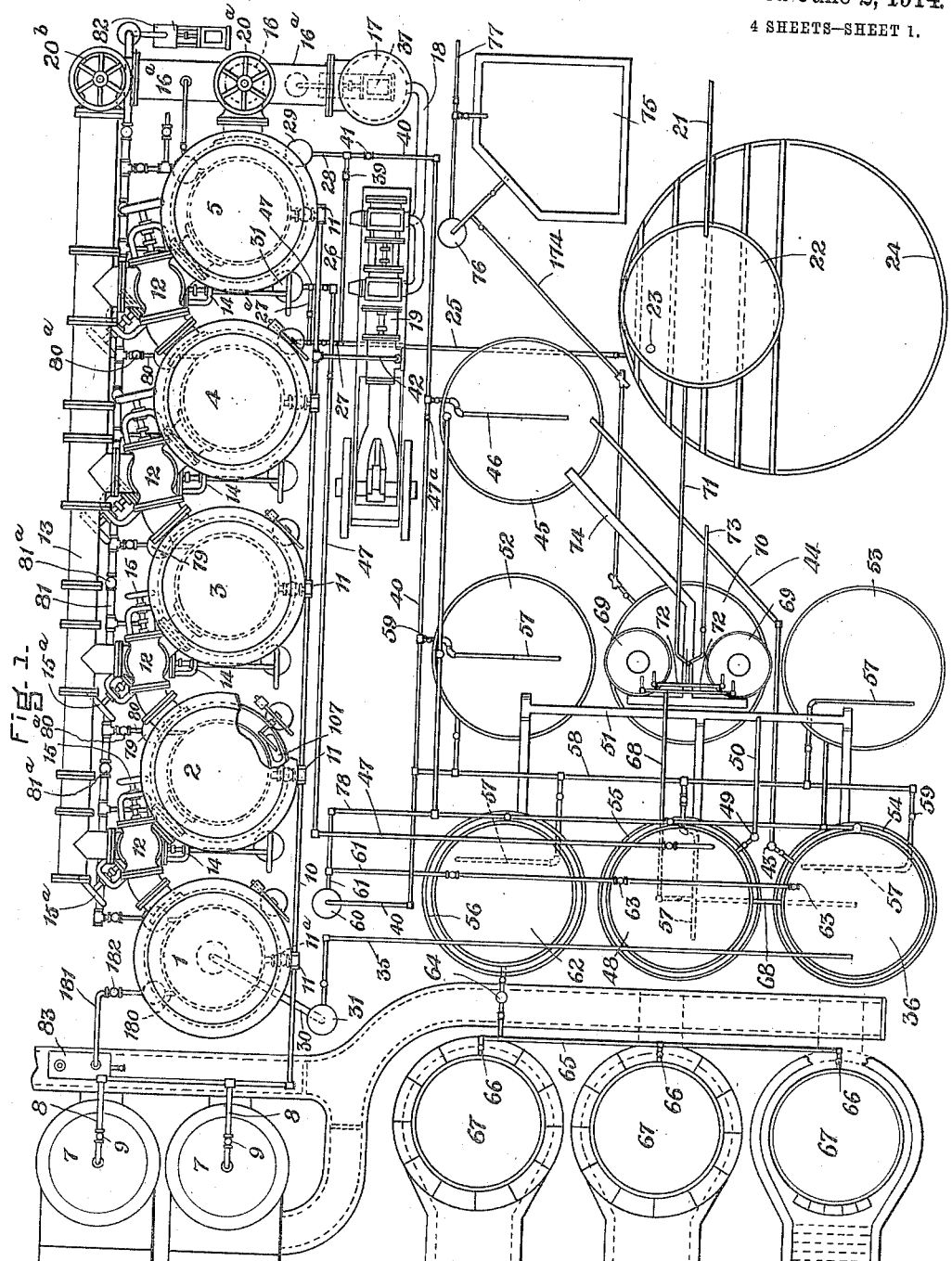

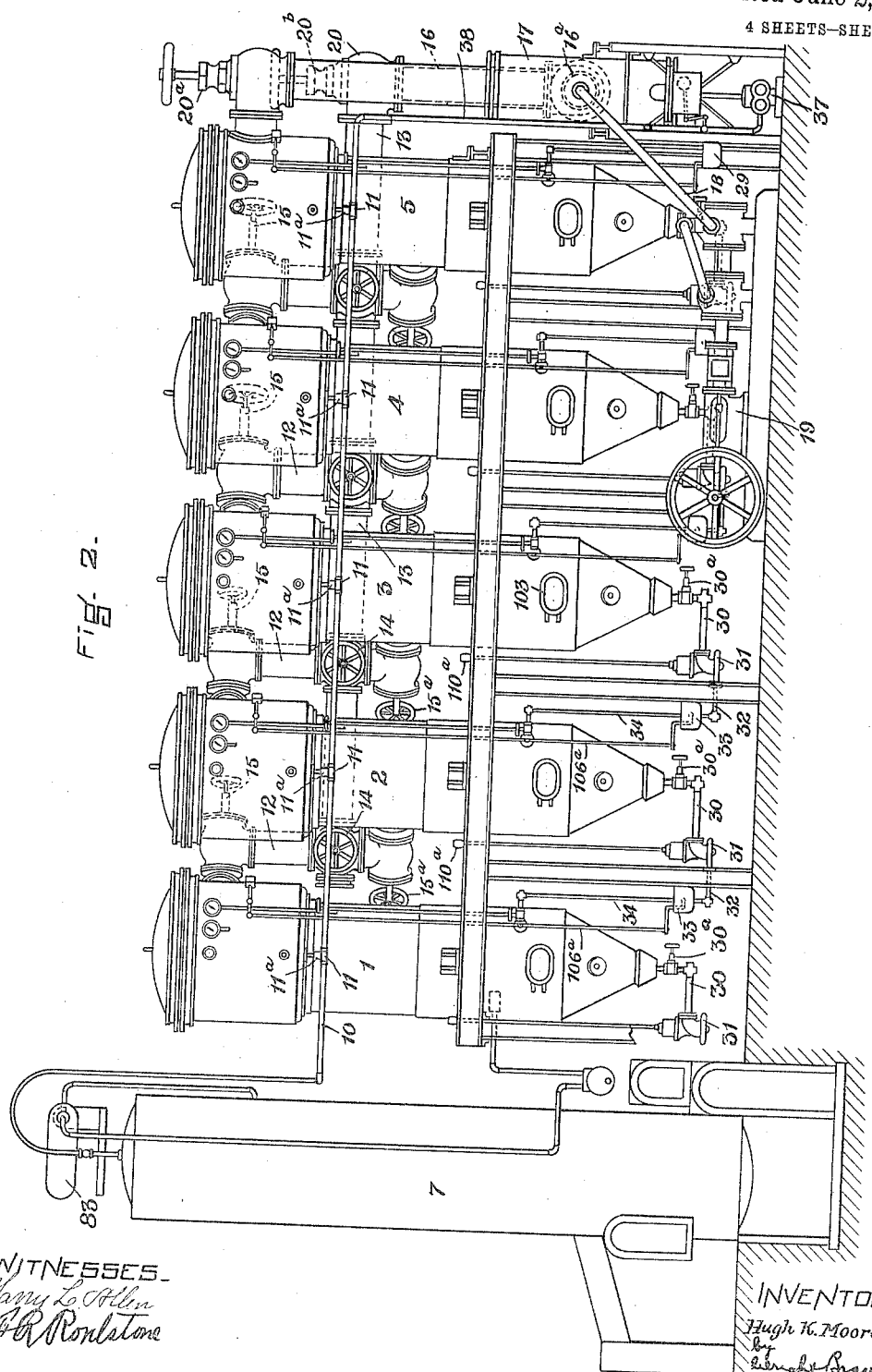

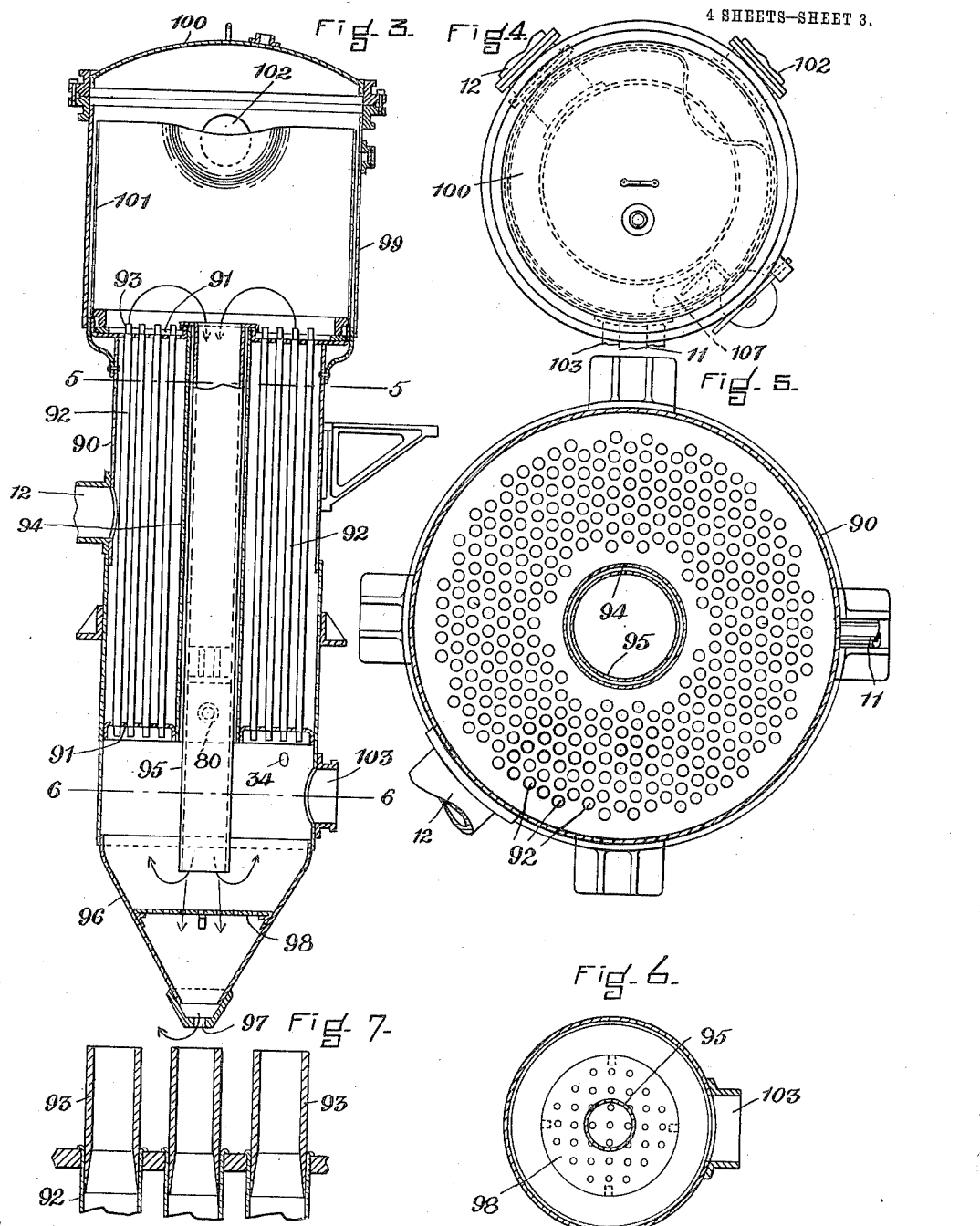

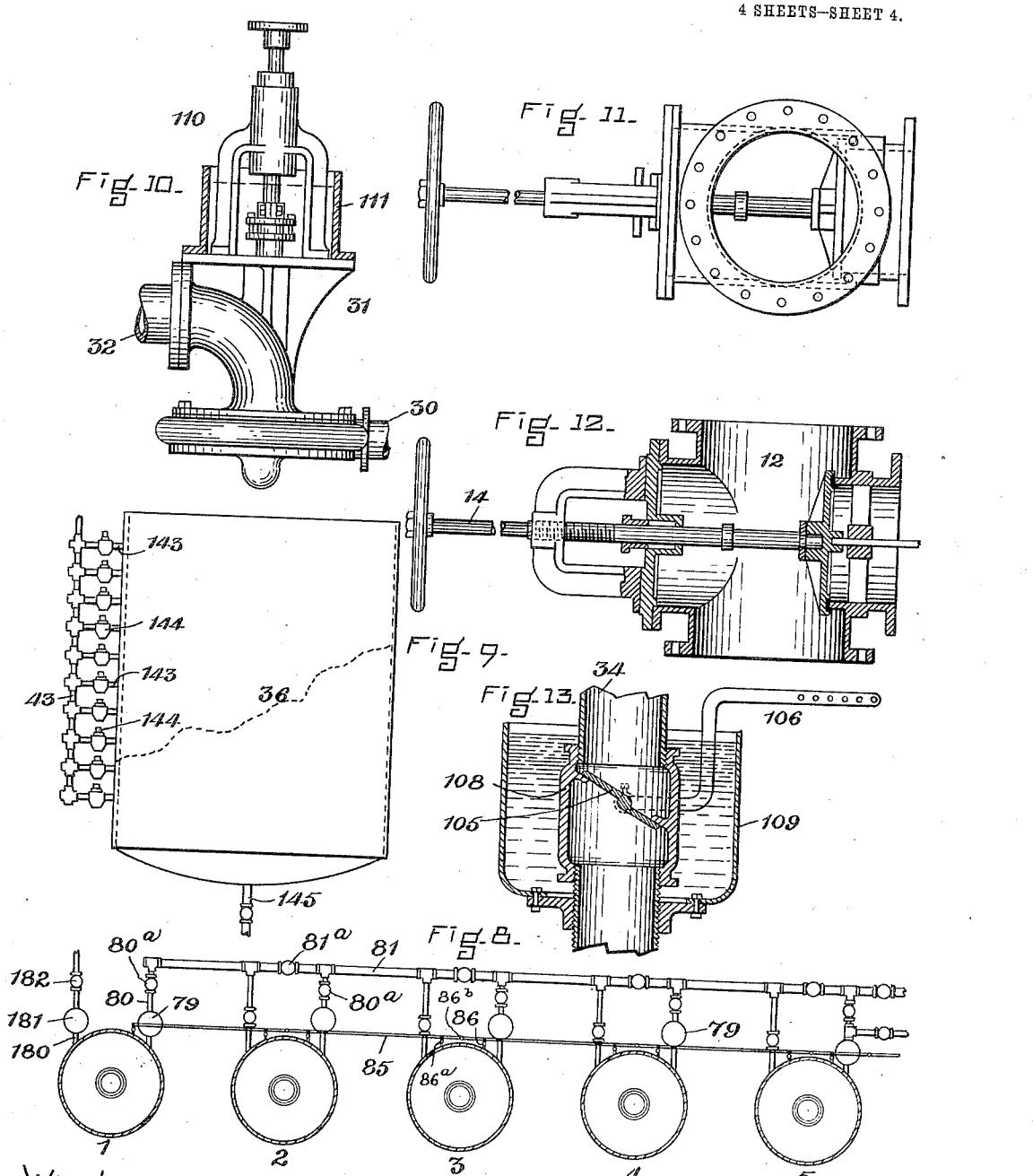

HUGH K. MOORE, OF BERLIN, NEW HAMPSHIRE.

EVAPORATING AND CONCENTRATING APPARATUS.

1,098,825.  Specification of Letters Patent.  Patented June 2, 1914.

Application filed December 12, 1910. Serial No. 596,979.

*To all whom it may concern:*

Be it known that I, HUGH K. MOORE, of Berlin, in the county of Coos and State of New Hampshire, have invented certain new and useful Improvements in Evaporating and Concentrating Apparatus, of which the following is a specification.

This invention has relation to methods and instrumentalities for separating salt and other impurities from a solution of caustic soda and salt. In the practical operation of electrolytic cells for the manufacture of chlorin and caustic soda, the cathionic discharge from the cells contains in solution not only caustic soda but a quantity of salt and other impurities. By means of my method and the instrumentalities, I am able to evaporate from the solution a large portion of water therein contained and to remove the salt and other impurities so that the resultant material contains approximately 50% of caustic soda in condition for commercial usage. Prior to the removal of the salt, it is crystallized and precipitated while the caustic soda remains in solution. This is accomplished by evaporation and condensation of the water contained in the solution, and, in order that such evaporation and condensation may be accomplished with the least possible expense, I provide what I term a "multiple effect" by utilizing a plurality of condensers which at the same time operate as evaporators for the solution which passes through them in series. Steam is passed through the condensers in a direction opposite to the flow of the solution therethrough. This steam is introduced into the first condenser of the series, and, being condensed therein, heats the solution therein contained so as to form steam, which in turn passes to the next of the condensers, being therein condensed and forming steam from the solution therein contained, and so through the whole series of condensers.
Thus the last evaporator for the solution is the first condenser for the steam, as the steam and the solution, as stated, pass in opposite directions from one combined evaporator and condenser to the other.
I have discovered that per pound of water it takes less heat to evaporate the water from a weak solution of caustic soda than it does to evaporate the water from a strong solution of caustic soda, because in the latter case the heat must be sufficient to more than equalize the heat due to the chemical combination between the water and the caustic soda. That is to say, to evaporate the water of a given solution of caustic soda, heat must be supplied to equal the increment of heat generated by the chemical combination of the caustic soda and the water, the increment of heat sufficient to evaporate the water, and the increment of heat sufficient to raise the remaining caustic solution to the boiling point of such solution. As the concentration of the solution increases, these increments of heat likewise greatly increase. Consequently, according to my method, I supply to the most concentrated caustic solution sufficient heat, first, to bring it to the boiling point, second, to equalize the heat due to the chemical combination, and, third, to raise the heat of the steam therefrom to the desired temperature. The steam, rising from the solution, is conducted to the next combined condenser and evaporator where the solution is weaker, and is at a temperature sufficient to raise the solution therein contained to its boiling point (which is lower than that of the strongest solution) and to generate and heat the steam therefrom at a desired temperature, which, however, is lower than the steam generated in the preceding evaporator and condenser. This occurs in the successive combined evaporators and condensers until finally the steam, which is admitted to the last condenser and evaporator, is at a relatively low temperature, but nevertheless sufficient to evaporate to some extent the water contained in the solution therein. Thus, the weakest solution in the last condenser passes to the next condenser in a more concentrated solution, and, when finally the solution is discharged from the first condenser, it is in its most concentrated form.

The concentrated solution is drawn from the first condenser with the salt therein contained, crystallized and precipitated, and the salt is removed by any suitable means as by permitting the salt to settle. When operating the apparatus as four effects, the salt may be settled out, and the solution subjected to further evaporation to concentrate it to a solution of approximately 50%, this being preferably accomplished *in vacuo* by exhaust steam from any one of the pumps or engines used in carrying out the process. This causes the precipitation and crystallization of practically all of the remaining salt which is removed by the settling, centrifugalization, and settling again, as will be explained more in detail, although it will be understood that any convenient method or appliances may be utilized for removing said crystallized and precipitated salt.

It will be understood that the process, which I have thus outlined briefly, is continuous and not intermittent, the settling of the crystallized, precipitated salt being accomplished during the flow of the solution through its cycle of operations.

For the purpose of giving the best explanation of the invention, I have illustrated diagrammatically and conventionally on the drawings a substantially complete plant capable of operating as a quintuple effect for reclaiming the salt and effecting a concentration of the caustic soda to a 50% solution, and I have illustrated in detail some of the instrumentalities which I have found to be most efficient for the several purposes for which they are employed.

Referring to said drawings,—Figure 1 represents a diagrammatic plan view showing conventionally the instrumentalities for carrying out my process. Fig. 2 illustrates the condensers and adjacent instrumentalities in front elevation. Fig. 3 represents in vertical section one of the combined condensers and evaporators. Fig. 4 represents a plan view thereof. Figs. 5 and 6 represent sections on the lines 5—5, 6—6, respectively, of Fig. 3, Fig. 5 being on a larger scale. Fig. 7 illustrates in section the wearing nipples employed in the condensers. Fig. 8 represents diagrammatically the connections for relieving the condensers from trapped air, and also for the drip or water of condensation, the condensers being shown in horizontal section. Fig. 9 represents one of the salt-settling chambers or tanks. Fig. 10 illustrates one of the elbow valves for controlling the flow of steam from one condenser to another. Figs. 11 and 12 illustrate a valve for the same purpose in a different location. Fig. 13 represents one of the float-operated butterfly valves for controlling the supply of caustic to the condensers.

Referring to the drawings, the combined condensers and evaporators, which, for the sake of simplicity, I shall refer to as "condensers," are illustrated at 1, 2, 3 4 and 5 respectively in the order in which they are arranged with reference to the steam boilers indicated at 7 7. From these boilers, steam is conducted by pipes 8, 8 each equipped with a suitable valve 9 to a main pipe 10, said pipe having valved connections 11 with the condenser chambers of the five condensers. Ordinarily all of the valves 11ᵃ in the connections 11 are closed except that leading to condenser 1, so that the steam from the boiler is admitted only to the condenser chamber of condenser 1. From the evaporator chamber of the condenser 1, there is a conduit 12 communicating with the condenser chamber of condenser 2 and there are similar conduits connecting the similar chambers of condensers 2 and 3, 3 and 4, and 4 and 5. These various conduits or connections are connected with a manifold indicated at 13 extending alongside the condensers, there being a valve 14 for each connection with the manifold so that any one or more of the condensers may be cut out and the steam resulting from the evaporating chamber of any one condenser may be conducted to the condensing chamber of any one of the succeeding condensers of the series. Communication between each conduit 12 and its communicating chambers is controlled by valves 15 15ᵃ, as indicated in Figs. 1 and 2.

From the description thus far given, it will be seen, assuming that the valves in the connections 11 are closed to the condensers 2, 3, 4 and 5, that steam will be introduced into the condensing chamber of condenser 1, and that the steam formed in the evaporating chamber thereof will be conducted to condenser 2, it being assumed in this case that all of the valves 14 are closed and the valves 15 15ᵃ are open. The steam from the evaporating chamber of condenser 2 will be conducted to the condensing chamber of condenser 3, and so on until the steam from the evaporating chamber in condenser 4 will be caused to enter the condensing chamber of condenser 5. Connected with the evaporator chamber of condenser 5 is a conduit 16, which, by horizontal conduit 16ᵃ, is connected with a steam condenser 17, the latter being connected by a pipe 18 with a vacuum pump indicated as a whole at 19 in Figs. 1 and 2. The other end of the conduit 16ᵃ is connected by a valved elbow 20 with the manifold 13, the valve of said elbow being indicated at 20ᵇ. This valve is normally closed so that, when the pump is in operation, a vacuum will be created in the evaporating chamber of condenser 5. Thus, when the condensers are all connected in series by the proper adjustment of the valves, steam will enter the first condenser at high pressure and there will be a vacuum in the evaporator chamber of the fifth condenser.

As explained in the early part of the specification, the solution of salt, caustic and other impurities, is introduced into the evaporator chamber of condenser 5, and it flows therefrom through the evaporator chambers of condensers 4, 3, 2 and 1 in series, and thus the steam and the increasingly concentrated solution travel in opposite directions.

The initial solution is conducted from the cell shed through a supply pipe 21 to the small elevated tank 22 from which it flows through an overflow standpipe 23 to a large supply tank 24 arranged therebeneath. From the tank 24, the caustic solution flows through a valved pipe 25 which has two branches 26, 27 each provided with a valve. The branch 26 communicates by a pipe 28 with a butterfly valve 29 which is float-controlled, said valve communicating with the evaporator chamber in condenser 5. The outlet for the partially concentrated caustic in each evaporator chamber extends from the lower end of the condenser, and is indicated at 30 (see Fig. 2), and each pipe 30 connects with the inlet of a centrifugal pump 31, from the outlet of which a pipe 32 communicates with a butterfly valve indicated at 33 (similar to that at 29). Each butterfly valve is float-controlled by a float 107 located within the evaporator chamber, and, when the valve is open, the partially concentrated caustic flows through a valve-controlled pipe 34 to the evaporator chamber of the adjacent preceding condenser. Thus the effluent from condenser 5 is forced as needed into the evaporating chamber of condenser 4, the effluent from condenser 4 into the evaporating chamber of condenser 3, and so on until the highly concentrated effluent is discharged from the lower end of condenser 1, whence it passes through pipe 30, centrifugal pump 31 and pipe 35 to the settling chamber or vat 36. It will be observed that the outlet pipe for the effluent of each of the condensers is equipped with a valve indicated at 30ª.

Assuming in winter conditions that the evaporator chamber of condenser 5 contains 10% caustic solution, that the similar chamber of condenser 4 contains a 11.6% caustic solution, and that the similar chambers of condensers 3, 2 and 1 contain respectively 16.3%, 26% and 50% caustic solutions, the operation is as follows:—Steam from the boilers enters the condenser chamber of condenser 1 at 210 pounds per square inch, and, being condensed, imparts sufficient heat to the solution contained in the evaporator chamber to evaporate a portion of the water therein and the generation of steam at 22 pounds per square inch. The steam thus produced flows through the connection 12 into the condensing chamber of condenser 2, and the caustic solution in the evaporating chamber, being of less strength, is, by a condensation of the steam in the condenser chamber, heated to such an extent that the water therein is evaporated and steam is given off at approximately 8 inches vacuum (mercury) and passes through the connection 12 into the condensing chamber of condenser 3. There again, a still weaker solution is so heated by the condensation of the steam that the water therein is evaporated and steam is generated at 22 inches vacuum which passes into the condensing chamber of condenser 4. This steam, being condensed, heats the relatively weaker solution and causes the evaporation of the water and the generation of steam at 26.5 inches vacuum which passes into the condenser chamber of condenser 5. By reason of the vacuum contained in the evaporator chamber of condenser 5, to wit 28.5 inches, the water in the weakest solution is evaporated by the condensation of steam in the condenser chamber and is withdrawn as steam into condenser 17. It settles in the lower portion of the condenser 17 from which it is withdrawn by a pump 37, said pump being operated by steam derived from a continuation 38 of the steam pipe 11 as indicated in Fig. 2.

The caustic solution flows from the tank 24 through pipes 25, 26, 28 and float-operated valve 29 into the evaporating chamber of condenser 5, thence being partially concentrated it flows out through outlet pipe 30 and is forced by centrifugal pump 31 into the evaporator chamber of condenser 4, the flow into the said chamber 4 being regulated by the float-controlled valve 33. From the evaporator chamber of the condenser 4, the now more concentrated solution flows into the evaporating chamber of the condenser 3, and so on until it reaches the evaporating chamber of condenser 1 where it receives its final concentration and is carried away to the settling chamber 36 as has been explained. The operation is continuous and not intermittent, there being a constant inflow of fresh caustic solution to condenser 5 and the outflow of the concentrated solution from the condenser 1. The various valves are provided so that any one or more of the condensers may be cut out for repairs without interfering with the process, although, of course, steam under greater pressure and in greater amount will be required in such case.

In starting the operation, assuming that all of the condensers are empty, the evaporating chamber of condenser 5 is filled to the proper level with the initial weak solution (approximately 8% to 9%). The valves of the connections 11 with condensers 1, 2, 3 and 4 are closed, and the valve of connection 11 with condensing chamber of condenser 5 is opened so that steam from the boiler is introduced thereinto and the solution evaporated until it is at proper strength, say 10%. The partially concentrated solution is then pumped from the evaporating chamber of condenser 5 into the evaporating chamber of condenser 4, it being replaced in condenser 5 by a fresh solution. The valve connection 11 between the steam pipe 10 and condenser chamber of condenser 4 is opened, that into condenser 5 being closed. The two condensers are then run as a double effect until the caustic solution in the evaporating chamber of condenser 4 is substantially 11.6%. Then the contents of the evaporating chambers of condensers 4 and 5 are pumped respectively into evaporating chambers of condensers 3 and 4, condenser 5 being again filled with the fresh solution. Communication between the steam pipe 11 and condenser chamber of condenser 3 being established, and the condensing chambers of condensers 4 and 5 being disconnected from the steam pipe, the apparatus is operated as a triple effect. This operation is continued until the solutions in the evaporating chambers of condensers 1 to 5 are of the proper respective strengths hereinbefore given, after which the whole apparatus is operated as a quintuple effect.

As a practical matter, the concentration of the solution causes the gradual precipitation and crystallization of salt, which, by its friction with the tubes of the condensers, has a tendency to wear them out quickly. Furthermore the precipitation and crystallization of the salt renders it very difficult to effect a flowage of the mixed salt and solution, and for these reasons I prefer to remove a large portion of the salt before the final concentration of the solution is effected. To this end, I provide for feeding the initial solution to the evaporating chamber of condenser 4 and operate the plant as a quadruple effect. Then from the settling chamber, after the salt has been settled out from the solution delivered from condenser 1, I conduct the solution to condenser 5 where the fifth effect is secured and the final concentration of the caustic takes place, as will now be explained.

By examining Figs. 1 and 2, it will be noted that the supply pipe 25 has the branch 27 which, through a valved pipe 27ª, communicates with the centrifugal pump 31 which forces the liquor into the evaporating chamber of condenser 4. In this case, the valve 39 in the branch pipe 26 is closed, and the pipe 28, which supplies the evaporating chamber of condenser 5, is supplied with a partially concentrated solution of caustic soda through a pipe 40 having a valve 41 which is open in this instance. It will further be noted that, connected with the steam pipe 10 between condensers 4 and 5, there is a steam pipe 42 connected with the exhaust from the engine which operates the vacuum pump 19, in consequence of which I am able to utilize this exhaust steam for the final evaporation of the more concentrated solution in condenser 5. The valve 20ᵇ, between the manifold 13 and the conduit 16ª, is opened and the valve is also opened which controls the conduit 12 between the evaporator chamber of condenser 4 and the manifold, so that the evaporator 4 will be operating under a vacuum. At the same time the valve 20ª is closed so as to cut off communication between the condenser 5 and the conduit 16 through the conduit 15.

It is desirable now to explain how the separation of the salt from the solution delivered from condenser 1 is secured before the clear solution is delivered to condenser 5 for the final concentration. I have stated that the effluent from the evaporating chamber of condenser 1 is delivered to the settling tank. The clear solution passes from said tank through a manifold 43 to a pipe 44 and is delivered into a tank 45. It is withdrawn from the tank by a siphon 46 which is connected with the pipe 40 (the latter communicating with pipe 28 and the valve 29 for supplying condenser 5), the valve 47ª in said pipe 40 being at this time closed. The solution from condenser 5 may now be further treated as follows: The concentrated solution in the lower end of condenser 5 is pumped by pump 31 connected therewith through a pipe 47 to a settling tank 48. The salt settles in the tank and the clear liquor passes therefrom through a manifold 49 and pipe 50 to a spout or trough 51. This trough has gates by which the solution may be delivered to tanks 52, 53, 54, 55 and 56, according to whichever gates are opened. A plurality of settling tanks are employed in order that the solution may be allowed to settle about seven days; being permitted to cool to about 80° F. Previous to cooling, sodium aluminate, sodium silicate and other impurities are skimmed off. Then the supernatant solution is cleared from the top of the tanks 52, 53, 54, 55, 56, as the case may be, by siphons 57 which are all connected with a pipe 58 (except the siphon 57 for the tank 52 which is connected with the pipe 40). For convenience the tanks 54, 55, 56, are shown as being located below tanks 36, 48 and 62. Each of the siphons has a valve 59. The pipe 58 is connected with the pipe 40 which at its left end is connected with a centrifugal pump 60 by which the clear solution is forced through a pipe 61 into a tank 62. Since salt may be drawn from the plurality of settling tanks 52 to 56 inclusive, the pipe 61 has valved connections 63 by which the salt may also be delivered to the tanks 48 and 36. From the tank 62 the clear solution flows through a manifold 64 to a pipe 65 having valved connections 66 with the kettles 67 which are heated by direct fire whereby the remaining water in the concentrated solution is evaporated, chlorate of soda is decomposed to salt and oxygen, and sodium ferrate is decomposed to ferric oxid (which settles to the bottom) and caustic soda. The caustic soda may now be drawn from the kettles by any suitable means in its commercial form. From the initial settling tanks 36 and 48, the settled salt is conducted by a pipe 68 to two centrifugal machines indicated at 69 where the solution which is removed is deflected into the spout 51, the salt being dropped into the tank 70 beneath said machines. Before dumping the salt into the centrifugal machines, they are washed by a weak solution of caustic soda from the tank 22 through a pipe 71 connected to branch nozzles 72, and, after the salt is placed in the machines, it is washed by clear water delivered to the nozzles 72 through a water supply pipe 73. The washing solution and the water are deflected into a spout or trough 74 which conveys them to the tank 45 which has hereinbefore been referred to. Water is added to the salt in tank 70 so as to dissolve it, and the brine is conducted by a pipe 174 to a brine tank 75. When the brine reaches the tank 75, the caustic which remains is transformed to salt by the addition of hydrochloric acid added in exact theoretical quantities after testing. Circulation is maintained by a pump 76 which is also utilized to pump the brine from the salt tank 75 to the cells through a pipe 77, where it is again electrolyzed, the caustic soda solution being supplied from the cells through the pipe 21 to the initial tank 22.

In ordinary operation, assuming that the plant has been running some time after having been started by the introduction of the weak caustic solution into the evaporating chamber of condenser 4, as previously explained, which passes through the various evaporating chambers until it reaches the chamber of condenser 1 from which it is withdrawn in a 26% solution,—the salt is removed in the settling tank 36 and the clear solution to the tank 45 whence it is drawn by the siphon 46, passing through branch pipe 40, pipe 28, and valve 29 into the evaporating chamber of condenser 5, and, being discharged therefrom in a solution of approximately 50% strength, is forced by the pump 31 through pipe 47 to the settling tank 48, whence it flows through manifold 49, pipe 50 to the trough 51 into the settling tanks where it is allowed to cool before being drawn to the kettles 67 as previously described in detail. The pipe 61, which is connected with the pump 60, has connected thereto a pipe 78 having branched valve connections extending into the tanks 45, 52, 56, 55, 54 and 53, so that the solution from any one of said tanks may be drawn therefrom and delivered to any other of the tanks by means of the pump 60, this being for convenience in disposing of the solutions from one tank to another, so that there will always be an empty tank to receive the more highly concentrated solution from which the salt has been partially removed, whereby there may be no interruption in the process.

It will be understood that the various instrumentalities which I have described are arranged at proper elevations to secure the flow which has been described, various pumps (not shown) being utilized where necessary. The water of condensation from the various condenser chambers is delivered through traps 79 and pipes 80 to a drip pipe 81, from which it is pumped by a pump 82 to any convenient place of disposal. Each of the pipes 80 is provided with a valve 80$^a$ and the pipe 81 is provided with valves 81$^a$. By a proper manipulation of these valves, the water of condensation from each condenser may be delivered to the next succeeding condenser in the series where it will be converted into steam. From condenser 1 there is another drip pipe 180 with a trap 181 and a valve 182 by which the drip may, if desired, be conducted to the trap tank 83 from which it is delivered to the boilers 7.

As stated in the preliminary portion of the specification, I have found that certain forms of instrumentalities are highly useful in carrying out the process, and consequently, in order that the invention may be enjoyed by the public after the expiration of this patent, I have illustrated the best forms of such instrumentalities now known to me. I will first describe one of the effects shown in Figs. 3 to 7 inclusive. Referring thereto, the condenser is illustrated as being provided with a cylindrical portion 90 having heads 91 through which are passed tubes 92. To save these tubes from wear occasioned by the passage of salt in the solution therethrough, at the end of each tube there is a nipple 93, the inner end of which is flaring as shown. I recommend the employment of these nipples for the reason that the life of the condenser is greatly prolonged inasmuch as any one of the nipples which becomes worn by the salt crystals may be replaced by another. Through the central portion of the cylinder is a large vertical tube 94 through which a sleeve 95 passes downwardly some distance below the lower head 91. It will be observed that the lower end of the sleeve extends some distance (about 3 feet in a condenser approximately 30 feet high) below the lower head and the lower ends of the small tubes. Hence the heavier and longer column of the caustic solution and the precipitates—principally salt—flows down through the large sleeve and the lighter columns of weaker solution circulate upwardly in an approximately vertical line as they approach the lower ends of the small tubes. This greatly reduces the wear on the lower ends of the small tubes or the nipples depending therefrom, inasmuch as the change in direction takes place in a plane below and remote from the said nipples. This is a feature of considerable practical importance. There is a small space between the sleeve and the tube which serves as an insulation, to partially prevent the conduction of heat to the sleeve which is therefore colder than the smaller tubes. This space becomes filled with precipitates, in time, which increase its insulating properties. This sleeve also prevents wear of the tube by the scouring action of the precipitates. The lower end of the condenser is in the form of an inverted cone 96 having at its apex an outlet 97 connected with the outlet pipe previously referred to. Across the conical end there is a grating or grid 98 suitably supported, which will catch the nipples if any become dislocated. The grid serves another important function, inasmuch as it defines or limits the zone of circulation of the solution below the lower end of the sleeve, and permits the settling of the precipitates in the lower end of the casing. Thus the lower end of the casing below the grid serves as a settling chamber for the precipitates, the grid preventing the settling precipitates from being drawn upwardly by the circulation of the solution. Between the heads 91 is the condensing chamber for the steam which enters through the valved pipe or connection 11, and the water of condensation is withdrawn through the valved pipe 80. Above the condensing chamber, the upper portion of the condenser is cylindrical and somewhat enlarged as indicated at 99 and is provided with a removable head 100. Within the upper portion there is an inner lining 101 forming a chamber which communicates with the interior of the tubes 92 and with the chamber at the lower end of the condenser. This forms the evaporating chamber, the steam passing therefrom through the outlet 102 communicating with the pipe or conduit 12. The solution enters the lower chamber below the lower head 91 through the port connected with the pipe 34. It will be observed that this port is located a distance above the lower end of the sleeve 95 and near the lower head, so that the weaker colder solution is immediately carried upwardly, on account of the vertical circulation through the small tubes, to be concentrated before it has a chance to settle and form a zone of colder liquid and thus be drawn off before it is concentrated. At 103 there is a manhole by which access may be had to the lower chamber to make repairs, this manhole being of course normally closed. The various condensers are made sufficiently strong to withstand varying pressures.

From the foregoing description, it will be seen that each effect provides a self-contained circulating evaporator chamber, in which a positive circulation of the solution is obtained. The solution in each chamber is in continuous circulation therein, and only the concentrated portion thereof and the precipitates are withdrawn and forced to flow into the evaporator chamber of the next hotter condenser or effect.

The inlet pipe 34 is provided, as stated, with a butterfly valve and this I have illustrated in Fig. 13, the pipe and the valve being in section. Referring to said figure, the valve member is indicated at 105 and it is adapted to rock, being connected with an arm 106, which, as shown in Fig. 1, is connected by a link 106ᵃ with a float 107 (see condenser 2, Fig. 1), said float resting upon the top of the solution in the evaporator chamber above the upper head. The level of the solution is usually in practice about 15 inches above the upper head and the upper ends of the tubes. Hence the tubes are always submerged. If the level of the liquid were below the upper ends of the tubes, rings or cylinders of salt would soon precipitate and bake on the inner surfaces of the tubes and gradually increase or build up in thickness until the tubes would be closed. This would take place in the course of an hour or two. The valve casing 108 is immersed in a water tank 109 to prevent the entrance of air by leakage.

In Fig. 10, I have illustrated one of the centrifugal pumps 31, to the inlet of which is connected the pipe 30 and to the outlet of which is connected the pipe 32. This pump is driven by any suitable means as by a pulley 110, rotated by a belt (not shown) from a suitable shaft. The pump has a water receptacle at 111 so that the bearing for the shaft 110 is water sealed and hence the possibility of the entrance of air to the pump is prevented.

In Figs. 11 and 12, I have illustrated one of the valves in one of the pipes 12 for controlling the passage of steam therethrough, said valve being especially designed for the purpose. As indicated in Figs. 1 and 2, this valve closes communication between the evaporating chamber of condensing chamber of two adjacent condensers with the manifold 13, although it does not interfere with the passage of the steam between said chambers.

In Fig. 9, I have illustrated one of the settling tanks, for instance that at 36. The manifold is indicated at 43, it consisting of a pipe having branches 143 opening into the tank. Each of the branches is provided with a valve or cock 144 so that any one of them may be opened to permit the discharge of clear liquor when those below it are apt to become clogged with salt. From the bottom of the tank there is a valve outlet 145 through which the precipitated or settled salt can be withdrawn.

I desire to have it understood that, while I have illustrated a plant practically in its entirety, the invention is not at all limited to the employment of the precise instrumentalities which I have described, and it should also be borne in mind that the drawings are necessarily conventional because of the small scale on which the various instrumentalities are shown. In describing the operation of the condensers, I have given the figures as they appear in actual practice, starting with an 8% or 9% solution of caustic soda, and consequently if the initial solution be more or less concentrated, these figures will vary. Moreover conditions change with the changes of atmospheric temperature from summer to winter, and the steam pressures which I have given will also vary. I have described the plant as being operated as a quadruple effect and also as a quintuple effect, but I would not consider it a departure from my invention if it were operated as a triple or even double effect. It should be noted that, even when the apparatus is being operated as a quintuple effect, the pressure of steam entering condenser 1 is relatively low, this being because the steam and the caustic solution travel in opposite directions through the condensers in series, the last condenser of the series being operated under a vacuum.

To prevent air binding, I provide what I term an air relief pipe 85 having two valved connections 86 86$^a$ with each condenser chamber, except with condenser 1 where there is but one connection, and having a valve 86$^b$ between the connections of each pair. By this pipe and the connections, the air may be drawn from the condenser chambers in series or in multiple, as may be desired. When the air passes from one condenser chamber to the next one, however, the steam or moisture carried over with it is condensed, and consequently its heat may be utilized in the evaporation of the hydrate solution.

I have not illustrated the bypass pipes which enable me to cause the solution to pass around any one of the condensers to the next succeeding condenser, since it would confuse the drawing, but in actual practice such bypass pipes are employed so that any one of the condensers may be cut out of operation.

Having thus explained the nature of my said invention and described a way of constructing and using the same, although without attempting to set forth all of the forms in which it may be made or all of the modes of its use, what I claim is:

1. Means for concentrating caustic solutions comprising a plurality of combined evaporators and condensers, each having a condenser chamber and a self-contained circulating evaporator chamber with submerged vertical tubes passing through the condenser chamber, and means for causing the concentrated solution to flow through the evaporator chambers in series but progressively from the coldest to the hottest chambers.

2. Means for concentrating caustic solutions comprising a plurality of combined evaporators and condensers, each having a condenser chamber and a self-contained circulating evaporator chamber with submerged vertical tubes passing through the condenser chamber, means for causing a positive internal circulation in each evaporator chamber, and means for causing the concentrated solution to flow through the evaporator chambers in series but progressively from the coldest to the hottest chambers.

3. Means for concentrating a caustic solution, comprising a series of combined condensers and evaporators having submerged vertical tubes and inverted-cone lower ends, conduits connecting the evaporator chamber of each one of said instrumentalities with the condenser chamber of the next succeeding, means for delivering steam to the condenser chamber of the first instrumentality, means for conducting said solution to the evaporator chamber of the last instrumentality, conduits for conducting the increasingly concentrated solution from the lower end of the evaporator chambers to the next hottest evaporator chamber, and pumps interposed in each of said conduits for forcing the solution therethrough.

4. Means for concentrating a caustic solution, comprising a series of combined condensers and evaporators having submerged vertical tubes and inverted-cone lower ends, conduits connecting the evaporator chamber of each one of said instrumentalities with the condenser chamber of the next succeeding, means for connecting a vacuum apparatus to the evaporator chamber of the last instrumentality, means for delivering steam to the condenser chamber of the first instrumentality, means for conducting said solution to the evaporator chamber of the last instrumentality, conduits for conducting the increasingly concentrated solution from the lower end of the evaporator chambers to the next hottest evaporator chamber, and pumps interposed in each of said conduits for forcing the solution therethrough.

5. The combination of a series of combined condensers and inverted-cone evaporators, conduits connecting the evaporator chamber of each one of said instrumentalities with the condenser chamber of the next succeeding instrumentality, means for connecting a vacuum apparatus to the evaporator chamber of the last instrumentality, means for delivering steam to the condenser chamber of the first instrumentality, means for conducting the solution to be concentrated to the evaporator chamber of the last instrumentality, conduits for conducting the concentrated solution from the bottom of each evaporator chamber commencing with the last instrumentality to the evaporator chambers of the next succeeding instrumentalities successively, a centrifugal pump interposed in each of said conduits for forcing the concentrated solutions therethrough to the next evaporator chamber, and float-controlled butterfly valves for controlling the delivery by said pumps of the concentrated solution through said conduits to said evaporator chambers.

6. The combination of a series of combined condensers and inverted-cone evaporators, each of said instrumentalities comprising a vertical casing, and submerged vertical tubes passing through the condenser chamber and communicating with the evaporating chambers, conduits connecting the evaporator chamber of each one of said instrumentalities with the condenser chamber of the next succeeding instrumentality, means for connecting a vacuum apparatus to the evaporator chamber of the last instrumentality, means for delivering steam to the condenser chamber of the first instrumentality, means for conducting the solution to be concentrated to the evaporator chamber of the last instrumentality, conduits for conducting the concentrated solution from the bottom of each evaporator chamber commencing with the last instrumentality to the evaporator chambers of the next succeeding instrumentalities successively, a centrifugal pump interposed in each of said conduits for forcing the concentrated solutions therethrough to the next evaporator chamber, butterfly valves for controlling the delivery by said pumps of the concentrated solution through said conduits to said evaporator chambers, and floats located in the evaporator chambers above said vertical tubes and controlling said butterfly valves.

7. The combination of a series of three or more instrumentalities each consisting of a combined evaporator and condenser, conduits connecting the evaporator chamber of one instrumentality with the condenser chamber of the next succeeding instrumentality, means for supplying a heating medium to the condenser chamber of the first instrumentality, a pump for pumping the solution from the evaporator chamber of each instrumentality to the evaporator chamber of the preceding instrumentality, float-controlled valves for regulating the inflow of solution to each evaporator chamber, a vacuum apparatus communicating with the evaporator chamber of the last instrumentality, and means for supplying the initial solution to the evaporator chamber of said last instrumentality, and means for discharging trapped air from said condenser chambers.

8. Means for evaporating and concentrating a caustic solution including a plurality of combined condensers and evaporators, each of said instrumentalities comprising a vertical shell, transverse heads therein and vertical tubes connecting said heads, and passing through the condenser chamber formed by the shell and the heads, means for delivering steam to the condenser chamber of the first instrumentality, means for delivering said solution to the evaporator chamber of the last instrumentality, pumps between said instrumentalities for forcing the solution through the hotter evaporator chambers successively, valves for controlling the flow of said solution, and floats located in the evaporator chambers above the upper heads therein for controlling the said valves.

9. Means for evaporating and concentrating a caustic solution including a plurality of combined condensers and evaporators, each of said instrumentalities comprising a vertical shell, transverse heads therein and vertical tubes connecting said heads, and passing through the condenser chamber formed by the shell and the heads, means for delivering steam to the condenser chamber of the first instrumentality, means for delivering said solution to the evaporator chamber of the last instrumentality, pumps between said instrumentalities for forcing the solution through the hotter evaporator chambers successively, and means for maintaining the level of the solution in the evaporator chambers above the upper heads of the condenser chambers.

10. A condenser and evaporator for concentrating caustic and like solutions, comprising an upright casing, having its lower end in the shape of an inverted cone, transverse heads between the ends of said casing to form a condenser chamber, a central vertical tube of large size passing through said heads for the downward flow of the solution being concentrated and small vertical tubes arranged around said central tube and passing through said heads for the upward flow of steam and the solution, a sleeve passing through said large tube and terminating at a distance below the lower head and below the lower ends of the small tubes, a discharge port in the inverted apex of the casing, and means for supplying the solution to the evaporator chamber at a level above the lower end of said sleeve.

11. A condenser and evaporator for concentrating caustic and like solutions, comprising an upright casing, having its lower end in the shape of an inverted cone, transverse heads between the ends of said casing to form a condenser chamber, a central vertical tube of large size passing through said heads for the downward flow of the solution being concentrated and small vertical tubes arranged around said central tube and passing through said heads for the upward flow of steam and the solution, a sleeve passing through said large tube and terminating at a distance below the lower head and below the lower ends of the small tubes, a discharge port in the inverted apex of the casing, means for supplying the solution to the evaporator chamber at a level above the lower end of said sleeve, and a transverse grid in said casing between said discharge port and the lower end of said sleeve.

12. Means for concentrating a caustic and saline solution and precipitating the salt comprising a series of communicating combined condensers and evaporators, means for continuously supplying steam to the condenser chamber of the first instrumentality, means for continuously supplying said solution to the evaporator chamber of the last instrumentality, means for continuously causing the increasingly concentrated solution and the precipitated salt to flow progressively from the evaporator chamber of the coldest to the evaporator chamber of the hottest instrumentality, means for continuously settling out the precipitated salt of the effluent discharged from the first instrumentality, a supplemental combined condenser and evaporator, and means for continuously supplying the effluent from said settling means to the evaporator chamber of the last-mentioned instrumentality to further concentrate said salt-freed effluent.

13. A combined condenser and evaporator, comprising an upright casing, transverse heads in the casing between its ends to form a condenser chamber, vertical tubes passing through said chamber for the internal circulation of the liquid to be concentrated, a steam eduction port in the upper end of the casing leading from the upper portion of the evaporator chamber, an inlet for the said liquid below and adjacent the lower head, an inner lining or shell within the upper portion of the casing, and means for maintaining the level of the solution to be concentrated above the upper head and below the top of the said lining or shell.

14. Means for concentrating caustic and precipitating salt contained in the solution, comprising a series of three or more combined condensers and evaporators or effects arranged in series, each having means for the internal circulation of the solution, means for supplying steam to the condenser chamber of the first effect, means for connecting a vacuum apparatus to the last effect, means for supplying such solution to the evaporator chamber of the last effect, and means for causing the flow of the increasingly concentrated solution through said effects successively from the coldest to the hottest effect.

15. Means for concentrating caustic and precipitating salt contained in the solution, comprising a series of three or more combined condensers and evaporators or effects arranged in series, each having means for the internal circulation of the solution and a salt-settling chamber in the bottom of the evaporator chamber, means for supplying steam to the condenser chamber of the first effect, means for connecting a vacuum apparatus to the last effect, means for supplying such solution to the evaporator chamber of the last effect, and means for causing the flow of the increasingly concentrated solution and of the precipitated salt from the bottom of each effect to the next hotter effect and through said effects successively from the coldest to the hottest effect.

16. The hereindescribed process of concentrating a caustic solution and precipitating salt contained therein, which consists in forcing such solution in one direction through a series of increasingly hotter evaporator chambers and against increasing pressures, evaporating the most highly concentrated portion of the solution by steam delivered from an exterior source, and evaporating the decreasingly concentrated portions of the solution by steam evaporated from the more highly concentrated portions thereof.

17. The hereindescribed process of concentrating a caustic solution and precipitating salt contained therein, which consists in forcing such solution in one direction through a series of increasingly hotter evaporator chambers and against increasing pressures, evaporating the most highly concentrated portion of the solution by steam delivered from an exterior source, evaporating the decreasingly concentrated portions of the solution by steam evaporated from the more highly concentrated portions thereof, and precipitating the salt in increasing quantities from the increasingly concentrated portions of the solution.

18. The hereindescribed process of concentrating a caustic solution and precipitating salt contained therein which consists in causing such solution to flow through a series of effects successively from the coldest to the hottest, causing the circulation of the increasingly concentrated portions of said solution within the evaporator chambers of such effects, and finally abstracting the precipitated salt.

19. The hereindescribed process of concentrating a caustic solution and precipitating salt contained therein which consists in causing such solution to flow through a series of effects successively from the hottest to the coldest, causing the circulation of the increasingly concentrated portions of said solution within the evaporator chambers of such effects, finally abstracting the precipitated salt, and concentrating by evaporation the salt-freed caustic solution.

In testimony whereof I have affixed my signature, in presence of two witnesses.

HUGH K. MOORE.

Witnesses:
E. BATCHELDER,
P. W. PEZZETTI.